United States Patent [19]

Lotz

[11] Patent Number: 4,583,718
[45] Date of Patent: Apr. 22, 1986

[54] NOZZLE FOR CUTTING BEARD REMOVAL

[75] Inventor: Horst K. Lotz, Wiesbaden-Delkenheim, Fed. Rep. of Germany

[73] Assignee: Aute Gesellschaft fur autogene Technik mbH, Zurich, Switzerland

[21] Appl. No.: 501,517

[22] Filed: Jun. 6, 1983

[30] Foreign Application Priority Data

Jun. 9, 1982 [EP] European Pat. Off. ........ 82105052.3

[51] Int. Cl.⁴ .............................................. B23K 7/06
[52] U.S. Cl. ........................................ 266/48; 266/49; 266/50; 266/51
[58] Field of Search ........................ 266/48, 49, 50, 51

[56] References Cited

U.S. PATENT DOCUMENTS 4,329,187 5/1982 Ushioda et al. .......................... 266/50
4,405,382 9/1983 Baier et al. ........................... 148/9 R Primary Examiner—W. Stallard
Attorney, Agent, or Firm—Gifford, VanOphem, Sheridan, Sprinkle & Nabozny

[57] ABSTRACT

A nozzle for the cutting beard removal where by means of additional heat supply the beard is liquified and blown away by the kinetic energy of a gas jet are formed by an upper and a lower nozzle plate with fuel gas discharge openings and an oxygen slot formed between them which is feeding an ever increasing quantity of oxygen at its longitudinal ends. This is reached by the oxygen slot forming the discharge end of a cone emerging from a distribution chamber enlarged in its longitudinal direction.

9 Claims, 3 Drawing Figures

NOZZLE FOR CUTTING BEARD REMOVAL

BACKGROUND OF THE INVENTION

This invention concerns a nozzle for the removal of cutting beards. By means of additional heat supply the oxygen cutting beard is liquified and blown away by the kinetic energy of a gas jet.

The strands produced in continuous strand casting installations are subdivided. The oxygen cut-off machines utilized for this purpose create slag beards underneath the cutting surfaces. The subsequent elimination of these beards with mechanical means is very expensive because of the necessary labor costs and machine work, which causes additional high costs for the production of the continuous strand casting.

Hence it has already been proposed to eliminate the beards by heating them up utilizing heating nozzles and to remove the beard with kinetic energy. For this complicated nozzle arrangements have been required for the liquidification of the beard slag and to blow it away. Corresponding nozzle arrangements have been very costly and required a determined angular adjustment in relation to the work piece and each other. Aside from the difficulty of reaching the optimal adjustment which often could not be obtained during the operation, the elimination of the cutting beards also was unsatisfying because of greater material losses at the work piece, particularly on its edges.

SUMMARY OF THE PRESENT INVENTION

To make a nozzle for the optimal cutting beard removal available without complicated nozzle arrangements and great material losses at the work piece.

The invention comprises of an upper and lower nozzle-plate with heating gas discharging holes and an oxygen discharging slot formed between them. Through this oxygen slit to its longitudinal opposite ends an ever increasing quantity of oxygen is emerging.

Practically this is achieved in such a manner that the oxygen-slot forms the discharging end of a cone chamber used as a pressure equalizing chamber enlarged in the longitudinal direction.

Advantageously several oxygen supply lines are leading into the equalizing chamber. Practically at both longitudinal sides below and above the oxygen slot, limited to its length, fuel gas discharging holes are arranged.

In an advantageous embodiment of the invention simple round-nozzles at both sides of the cutting-beard elimination nozzle are arranged in order to repress the liquid slag flow.

These nozzles can be alimented with oxygen, compressed air or steam and/or water.

Suitably the oxygen-slot of the nozzle is arranged in a 45 degree-position in relation to the cutting beard edge. Advantageously the nozzle in the displacing direction is 30 degree tilted to the work piece surface.

BRIEF DESCRIPTION OF THE DRAWING

The invention shall be illustrated by means of the sketches enclosed. The illustrations show.

DETAILED DESCRIPTION OF THE PREFERRED EMBODIMENT

Figure 1:
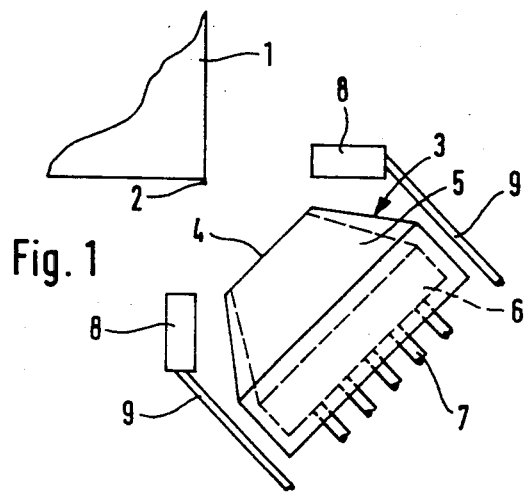
FIG. 1 a nozzle in working relation for the elimination of the oxygen cutting beard at a work piece in a schematic representation, FIG. 2 a top view at the nozzle out-let, FIG. 3 a further development of a nozzle according to FIG. 1 for the purpose of removal of mistakes.

In FIG. 1 a work piece 1 with a cutting beard 2 is represented. For the elimination of the cutting beard in a distance of about 15 to 25 mm a nozzle 3 is arranged showing an oxygen slot 4.

Figure 2:
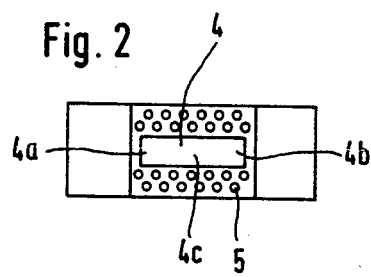

As FIG. 2 shows, the oxygen slot at its two longitudinal sides, limited by the length of the oxygen slot 4, is provided with two series of fuel gas openings 5. As shown with interrupted lines in FIG. 1, the oxygen slot 4 is the extreme end of a cone 5, emerging from an equalizing chamber 6, into which a number of feeding lines are leading 7. The oxygen inflow by the feeding lines 7 into the distribution chamber 6 is changed into a higher outflow at the longitudinal ends of the oxygen slot 4 by means of the cone guiding 5, so that into the oxygen slot a quantity profile is formed, which at both ends of the longitudinal slot 4a and 4b has its maximum values and between them a valley of inferior oxygen quantity with a minimum in the middle 4c of the oxygen slot 4. In this way a further liquification and removal of the slag flowing off from the edge of the work piece 1 is achieved without essential material edge losses of the work piece.

In order to repress slag flow outside of both longitudinal ends of the nozzles 3 simple round nozzles 8 are provided with individual feeding lines 9 and—not shown in detail—assembled with nozzle 3 to be one unit. By the feeding lines 9 oxygen or compressed air, but also steam and/or $H_2O$ can be supplied. With the nozzle described the elimination of the slag cutting beard is possible in an optimal manner. The liquification and the blowing away is effectuated at a speed of 3 to 4 m/min. Good results have been obtained with a pressure of 2.5 bar in the not-represented fuel gas alimentation line, 6 bar for the heating oxygen and 1.5 bar for the blowing oxygen. By heating with fuel gas an inferior scarfing effect only was reached. By increasing the oxygen pressure up to 3.5 bar, the heating oxygen to 4 bar and the cutting gas to 5 bar a scarfing speed of 8.5 to 13.5 m/min has been possible whereby at the work piece edges a rounding with a radius of 2 to 4 mm was experienced. At both sides of the work piece edges a material loss of 1 to 2 mm could be noticed. As FIG. 1 shows the nozzle 3 is so arranged that at the discharging end 4 the parallel line passing through the workpiece edge 1 together with the side surfaces of the work piece forms angles of 45°. In the working direction in relation to the movement plane the nozzle is forming an angle of about 30°.

Besides the advantages already described the invention nozzle also requires less space, so that without greater difficulties it can be used in existing installations.

Figure 3:
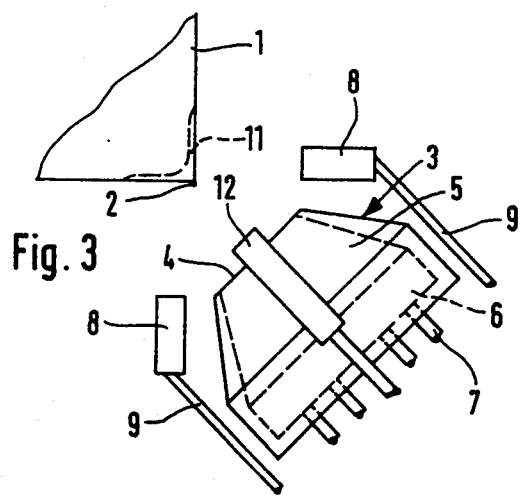

FIG. 3 shows further development of the nozzle. In case that there is a defect deeper in the material of a work piece in the area, such as corner flaws, it is desirable to obtain an enlarged melting area 11 as shown in dotted lines in FIG. 3 at the work piece 1. In case of use of such a flaw removal an additional oxygen nozzle 12 is provided. This oxygen nozzle 12 is provided about the nozzle 3 and discharges a parallel oxygen stream in order to deepen the melting zone 11. In this way mistakes in the work piece, piece, such as corner flaws and so on, are removed, and the nozzle arrangement obtains not only a beard removal but also the desired removal of flaws.

I claim:

1. A nozzle for the removal of a cutting beard whereby means of additional heat supply the beard is liquified and blown away by the kinetic energy of a gas jet, comprising an upper and a lower nozzle plate with fuel gas discharge holes and an oxygen discharging slot formed in between wherein through said oxygen slot at its longitudinal opposite ends an increased oxygen quantity is discharged.

2. The nozzle according to claim 1, wherein said oxygen slot forms the discharging end of a cone emerging from a distribution chamber enlarged in the longitudinal direction.

3. The nozzle according to claim 1 wherein a plurality of oxygen alimentation lines are fed into said distribution chamber.

4. The nozzle according to claim 1, wherein at said both longitudinal faces next to said oxygen slot, limited to its length, fuel gas openings are provided.

5. The nozzle according to claim 1, wherein at the two longitudinal ends simple round nozzles are provided in order to repress the slag flow.

6. The nozzle according to claim 5, wherein out of said round-nozzles oxygen is discharged.

7. The nozzle according to claim 5, wherein out of said round-nozzles compressed air is discharged.

8. The nozzle according to claim 5, wherein out of said round-nozzles steam and/or water is discharged.

9. The nozzle according to claim 1, wherein above the nozzle an additional oxygen ring nozzle is provided for discharging a generally parallel oxygen stream in order to deepen the formed melting zone at the work piece.

* * * * *